United States Patent
Solorio

(10) Patent No.: US 8,424,565 B2
(45) Date of Patent: Apr. 23, 2013

(54) FUEL MODULE WITH PIVOTING COVER

(75) Inventor: Jorge Solorio, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 673 days.

(21) Appl. No.: 12/579,762

(22) Filed: Oct. 15, 2009

(65) Prior Publication Data
US 2011/0089186 A1   Apr. 21, 2011

(51) Int. Cl.
*F02M 37/103*   (2006.01)

(52) U.S. Cl.
USPC ............... 137/565.17; 37/565.01; 123/509

(58) Field of Classification Search ............. 137/565.17, 137/565.34; 123/509
See application file for complete search history.

(56) References Cited

U.S. PATENT DOCUMENTS

| | | | |
|---|---|---|---|
| 5,522,425 A * | 6/1996 | Kroiss et al. | 137/565.17 |
| 6,000,913 A * | 12/1999 | Chung et al. | 417/53 |
| 6,752,129 B2 * | 6/2004 | Isozaki et al. | 123/509 |
| 2002/0119056 A1 * | 8/2002 | Appleton et al. | 417/360 |

\* cited by examiner

*Primary Examiner* — Craig Schneider
*Assistant Examiner* — Angelisa Hicks
(74) *Attorney, Agent, or Firm* — Mark H. Svoboda

(57) ABSTRACT

A fuel module for a vehicle has a fuel tank opening cover pivotably coupled to a module housing that holds multiple components including a fuel pump, filter, etc. The housing can be advanced lengthwise through the opening of a shallow fuel tank then turned horizontally to rest on the bottom of the tank, with the cover remaining parallel to the opening such that when the housing is in place in the tank the cover blocks the opening.

9 Claims, 3 Drawing Sheets

FUEL MODULE WITH PIVOTING COVER

FIELD OF THE INVENTION

The present invention relates generally to fuel modules, and more particularly to fuel modules with pivoting covers.

BACKGROUND OF THE INVENTION

Fuel modules have been provided in which much of a vehicle's fuel system is enclosed in a single housing. Thus, a fuel module may include a fuel pump, a fuel strainer, a pressure regulator, and a fuel filter, and typically is mounted on or in the fuel tank of the vehicle.

SUMMARY OF THE INVENTION

As recognized herein, some fuel tanks are relatively shallow, requiring relatively shallow fuel module reservoirs (which hold the above components). However, as also understood herein shallow fuel module reservoirs may be relatively long to accommodate the interior components, complicating installation of the relatively long reservoirs through relatively small openings in fuel tanks.

Accordingly, a fluid module for a vehicle includes a module housing defining a reservoir and components such as a fluid pump in the housing. A cover is pivotably engaged with the housing for blocking an opening of a fuel tank into which the housing can be advanced. The cover is pivotable relative to the housing between an install configuration, wherein the cover lies along a long axis defined by the housing, and an operate configuration, wherein the cover lies along an axis that is substantially perpendicular to the long axis defined by the housing.

In example embodiments preferably two guide rods are coupled to the cover and extend to a respective pivot block. Each pivot block pivotably engages a pivot pin on the housing. The pivot pins can be disposed on opposite walls of the housing.

In some implementations a respective elongated vertical guide is on each of the opposite walls of the housing and is arranged to abut a first surface of the respective pivot block. If desired, a respective horizontal guide may also be provided on each of the opposite walls of the housing and arranged to abut a second surface of the respective pivot block. This surface assists the pivot pin by absorbing some push down force during installation so that the entire force is not absorbed by the pin. For each pivot block the first surface may be established by a parallelepiped-shaped main portion of the pivot block and the second surface may be established by a buttress portion protruding outwardly from the main portion.

As discussed below, each pivot pin can engage a channel of the respective pivot block. An example channel may include a T-shaped portion adjoined to an entry portion.

In another aspect, a fuel module has a housing configured for advancement through an opening of a fuel tank onto a bottom surface of the fuel tank, and components such as a fuel pump and a fuel filter can be in the housing. A cover is configured to block the opening. The cover is coupled to the housing such that the housing can be advanced lengthwise through the opening then turned to lie lengthwise on the bottom of the fuel tank.

In another aspect, a method includes advancing a housing of a fuel module through an opening of a fuel tank, with a cover of the module remaining outside the tank. The method also includes turning the housing within the tank to rest on a long surface of the tank, and blocking the opening using the cover.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The present invention is intended for application in automotive vehicle systems and will be described in that context. It is to be understood, however, that the present invention could also be successfully applied in other fuel delivery applications.

Figure 1:
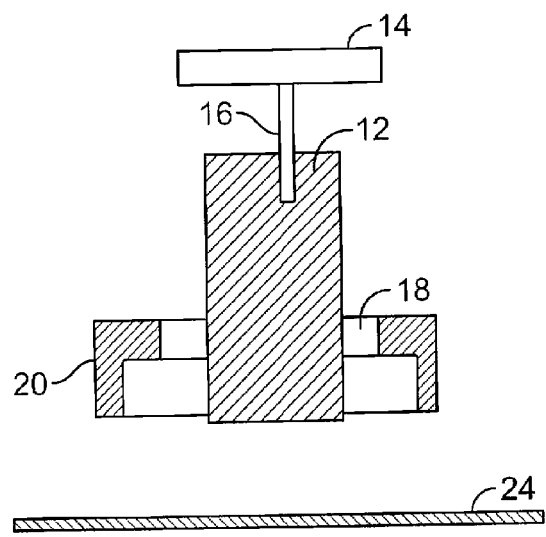
FIGS. 1-3 are a sequence of schematic views of the fuel module illustrating the cover pivoting with respect to the reservoir during the installation process.
Figure 2:
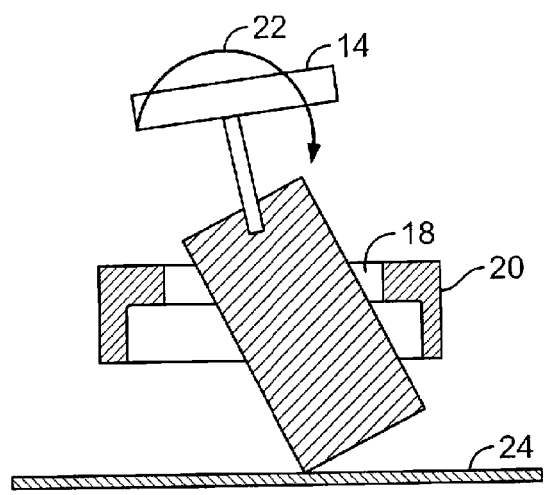
Figure 3:
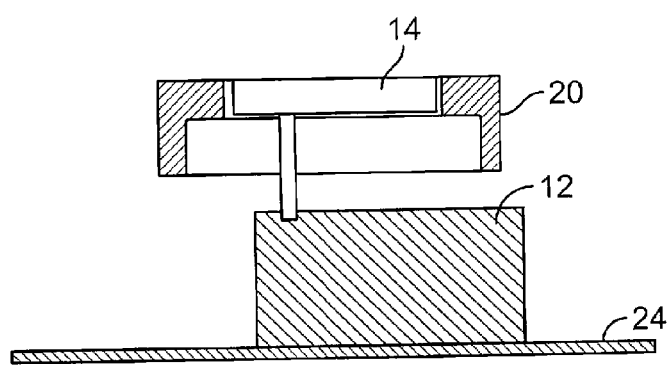

Referring initially to FIG. 1, a fuel module is shown, generally designated 10, that includes a hollow lightweight metal or plastic housing 12 coupled to a cover 14 by (preferably two or more) guide rods 16. As shown in FIG. 1, the housing 12 can be advanced lengthwise through an opening 18 of a relatively shallow fuel tank 20, then turned as shown by the arrow 22 in FIG. 2 through an intermediate position to an operate position shown in FIG. 3, in which the housing 12 lies lengthwise on the bottom 24 of the fuel tank 20 with the cover 14 blocking the fuel tank opening 18.

In example embodiments, one way to achieve the above is to render the cover 14 pivotably engageable with the housing 12. The cover 14 can be pivoted relative to the housing 12 between an install configuration (FIG. 1), wherein the cover lies along the long axis defined by the housing 12 as shown, and an operate configuration (FIG. 3), wherein the cover lies along an axis that is substantially perpendicular to the long axis defined by the housing 12 as shown, permitting the cover to block the opening 18.

Figure 4:
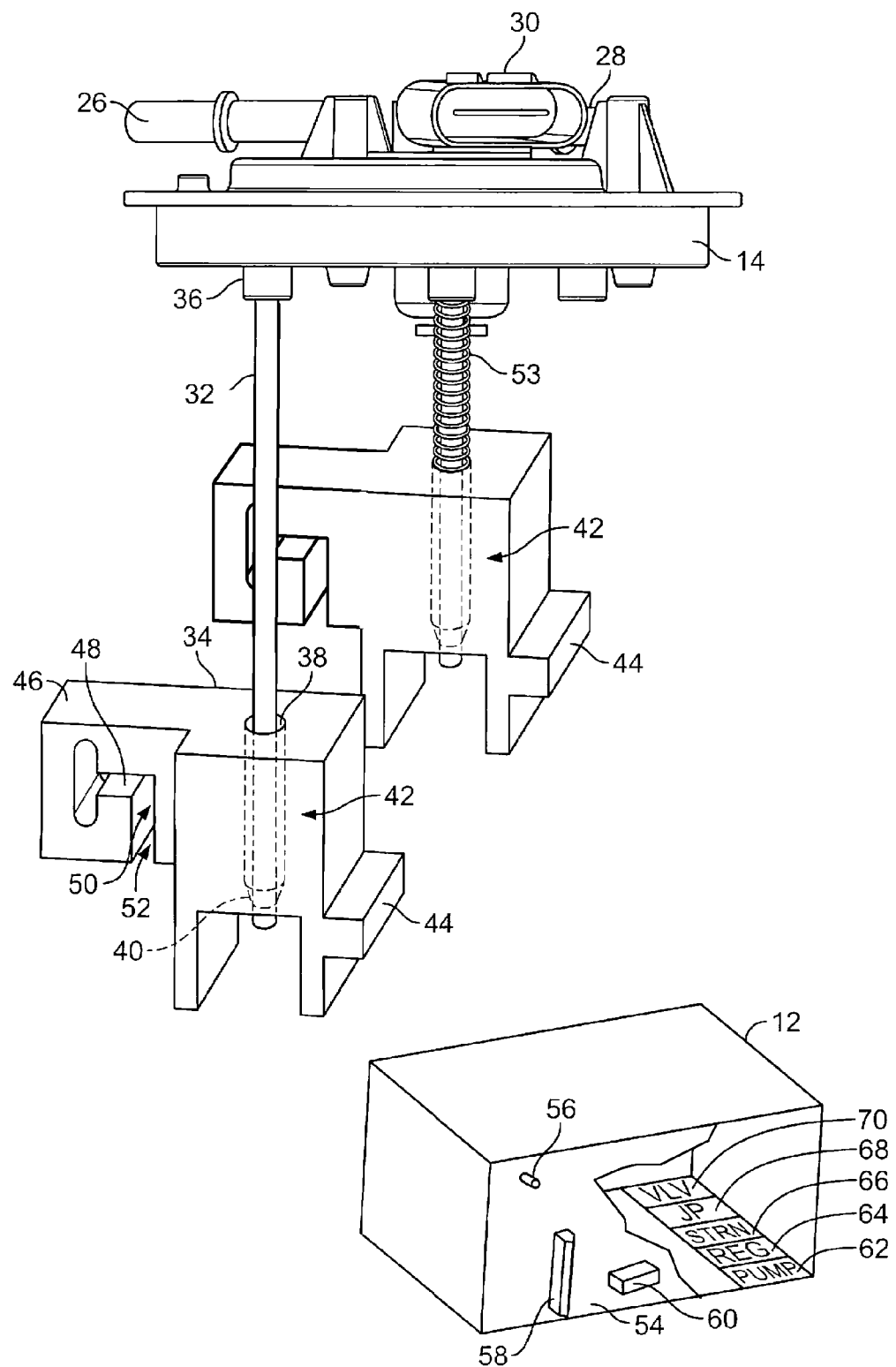
FIG. 4 is a perspective view showing the cover with pivot blocks in an exploded relationship with the reservoir, with a side wall of the reservoir shown partially cut away to illustrate the exterior pivot guides and pivot pin on one side of the reservoir, omitting the guides and pin on the opposite side of the reservoir for clarity and schematically showing internal components that may be held in the reservoir in example embodiments.
Figure 5:
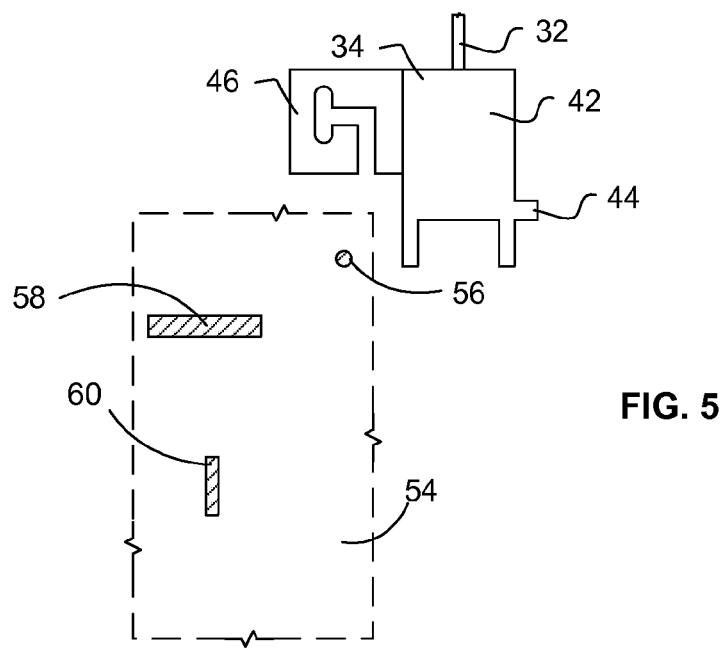
FIGS. 5 through 7 are side elevation views schematically showing the cooperation between the pivot pin and the slot in a pivot block, and between the pivot guides and surfaces of the pivot block, during pivoting of the cover, with the cover and portions of the reservoir apart from the pivot pin and the pivot guides omitted for clarity.
Figure 6:
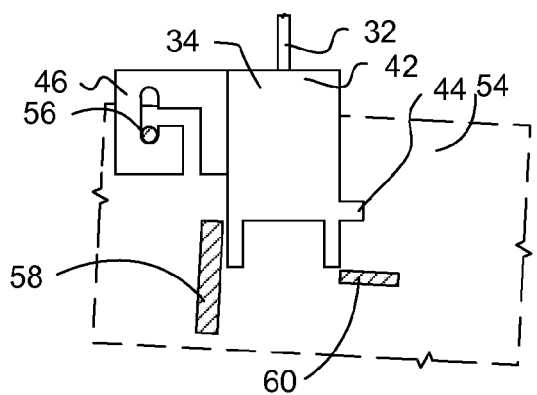

FIGS. 4-6 show a non-limiting example implementation of pivoting structure to accomplish the above. As shown in FIG. 4, the cover 14 may be formed with supply and discharge fittings 26, 28 that engage respective fuel lines and that communicate with the reservoir of the housing 12 to supply fuel to and discharge fuel from the housing. An electrical connector 30 may also be associated with the cover 14 and may be connected to the vehicle's electrical system and to one or more of the below-described components of the housing 12 to power the components. Connections between the various components in the housing 12 and the fittings 26, 28 and connector 30 of the cover 14 are omitted for clarity.

At least one and preferably two guide rods 32 are coupled to the cover 14 and extend to respective pivot blocks 34. In one embodiment each guide rod is received tightly in a respective rod receptacle 36 on the face of the cover 14 that faces the housing 12. Also, each guide rod 32 may be received in a rod channel 38 of the respective pivot block 34 and may be held in the rod channel 38 by a grip fitting 40 formed at the end of the rod channel 38, which establishes a tight interference fit between the guide rod 32 and grip fitting 40.

Each example non-limiting pivot block includes a respective parallelepiped-shaped main portion 42 that defines the rod channel 38. The main portion 42 can have a square cross-section as shown. The pivot block 34 may also be formed with a smaller parallelepiped-shaped buttress portion 44 protruding outwardly from the main portion 42 and, on the side of the main portion opposite to the buttress portion 42, a parallelepiped-shaped channel portion 46. The channel portion 46 may be thinner than the main portion 42 as shown.

In the example shown, the channel portion 46 defines a pin channel established by a T-shaped portion 48 adjoined to an entry portion 50 that is generally parallel to the cross bar of the "T" as shown. The entry portion 50 defines an open end 52 through which a below-discussed pivot pin can pass. A spring 53 may be disposed in compression around a guide rod 32 (two springs, one around each guide rod, may be used) between the pivot block 34 and cover 14 to absorb expansion and compression of the assembly over its lifetime.

Turning to the housing 12, on one long side wall 54 the housing is formed with exterior structure for engaging a pivot block 34, it being understood that the long wall opposite the side wall 54 is formed with similar structure for engaging the other pivot block. A preferably rigid pivot pin 56 extends outward from the side wall 54 as shown to engage the pivot channel 48 of the pivot block 34. Also, a respective elongated preferably rigid vertical guide 58 is formed on or otherwise engaged with the side wall 54 and is arranged to abut a side surface of the main portion 42 of the respective pivot block in the operate position. Further, in the example shown a respective horizontal guide 60 that may be shorter than the vertical guide 58 is on the side wall 54 and is arranged to abut a surface of the buttress portion 44 of the pivot block 34 in the operate position. This surface assists the pivot pin by absorbing some push down force during installation so that the entire force is not absorbed by the pin. Also, a side of each pivot block 34 touches the outside surface of a side wall of the housing in the operate position. With this structure, the housing 12 is constrained to facilitate pivotal motion between the housing 12 and cover 14.

As schematically shown for completeness and by way of example only, a fuel pump 62 can be disposed in the housing 12 and the fuel pump may take suction on the reservoir defined by the housing 12 and discharge fuel to a fuel filter or strainer 66 that is configured to remove impurities from fuel passing through it. The fuel filter or strainer 66 can discharge filtered fuel to the engine. Other components may also be included such as a pressure regulator 64 that may communicate with the discharge of the fuel filter or strainer, a jet pump 68, and one or more valves 70.

Figure 7:
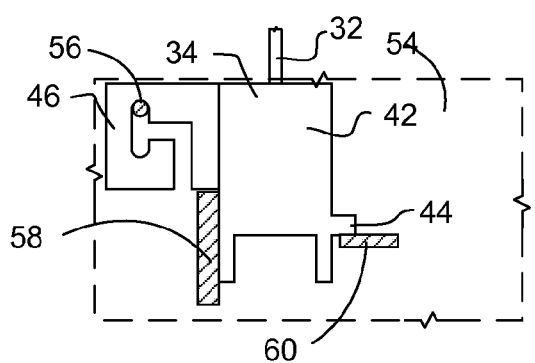

FIGS. 5 through 7 further illustrate principles discussed above. FIGS. 5 through 7 show a pivot block 34 and a portion of side wall 54 of housing 12, with the portion of the side wall 54 having defined on it the pivot pin 56 and guides 58 and 60. Because the pivot pin 56 and the guides 58 and 60 are defined on the side wall 54, the relative spacing between the pivot pin 56, the guide 58, and the guide 60 remains fixed. In FIG. 5, the pivot block 34 and the portion of the side wall 54 are depicted prior to engagement of the pivot pin 56 into the channel portion 46 of the pivot block 34. It is to be appreciated that the pivot blocks 34 are advanced such that the pins 56 enter the open end 52 of each entry portion 50, then up the stalk of the T-shaped portion and into the cross-bar of the "T". FIG. 6 illustrates details of an intermediate configuration, in which each pin 56, after the pivot block 34 has been advanced over the housing 12 to permit the pin 56 to ride into the pivot channel, is disposed near the bottom of the cross-bar of the T-shaped channel 48. In FIG. 6, the portion of side wall 54 has been rotated counterclockwise relative to its position in FIG. 5 to approach the final operate position. As the side wall 54 is rotated with the pivot pin near the bottom of the cross-bar of the T-shaped channel 48, the guides 58 and 60 are free to move without interfering with the pivot block 34. FIG. 7 illustrates details of the operate configuration of FIG. 3, in which each pivot pin 56 is located near the top of the cross-bar of the T-shaped channel 48. As discussed above with respect to FIG. 3, FIG. 5 shows that the vertical guide 58 is arranged to abut a side surface of the main portion 42 of the pivot block 34 in the operate position, and the horizontal guide 60 is arranged to abut a surface of the buttress portion 44 of the pivot block 34 in the operate position. Disassembly is the reverse of the above.

While the particular FUEL MODULE WITH PIVOTING COVER is herein shown and described in detail, it is to be understood that the subject matter which is encompassed by the present invention is limited only by the claims. For example, in addition to the above connection mechanisms, other quick connect/quick disconnect type of mechanisms may be used.

What is claimed is:

1. A fluid module for a vehicle, comprising:
   a module housing;
   at least a fluid pump disposed in the housing; and
   a cover pivotably engaged with the housing for blocking an opening of a fuel tank into which the housing can be advanced, the cover being pivotable relative to the housing between an install configuration, wherein the cover lies along a long axis defined by the housing, and an operate configuration, wherein the cover lies along an axis that is substantially perpendicular to the long axis defined by the housing;
   the module further comprising two guide rods each coupled to the cover and extending to a respective pivot block, each pivot block pivotably engaging a pivot pin on the housing associated with the respective pivot block, the pivot blocks engaging respective pins on the housing, the pivot pins being disposed on opposite walls of the housing;
   the module further comprising a respective elongated vertical guide on each of the opposite walls of the housing arranged to abut a first surface of the respective pivot block.

2. The module of claim 1, comprising a respective horizontal guide on each of the opposite walls of the housing arranged to abut a second surface of the respective pivot block.

3. The module of claim 2, wherein for each pivot block the first surface is established at least in part by a parallelepiped-shaped main portion of the pivot block and the second surface is established at least in part by a buttress portion protruding outwardly from the main portion.

4. The module of claim 1, wherein each pivot pin engages a channel of the respective pivot block.

5. The module of claim 4, wherein the channel includes a T-shaped portion adjoined to an entry portion.

6. A fuel module, comprising:
- a housing configured for advancement through an opening of a fuel tank onto a bottom surface of the fuel tank;
- at least a fuel pump in the housing;
- cover configured to block the opening, the cover being coupled to the housing such that the housing can be advanced lengthwise through the opening then turned to lie lengthwise on the bottom of the fuel tank;
- the fuel module further comprising two guide rods each associated with a respective pivot block, the guide rods being connected to the cover, the pivot blocks engaging respective pins on the housing, the pivot pins being disposed on opposite walls of the housing;
- the fuel module further comprising a respective elongated vertical guide on each of the opposite walls of the housing arranged to abut a first surface of the respective pivot block and a respective horizontal guide on each of the opposite walls of the housing arranged to abut a second surface of the respective pivot block.

7. The module of claim 6, wherein for each pivot block the first surface is established at least in part by a parallelepiped-shaped main portion of the pivot block and the second surface is established at least in part by a buttress portion protruding outwardly from the main portion.

8. The module of claim 6, wherein each pivot pin engages a channel of the pivot block.

9. The module of claim 8, wherein the channel includes a T-shaped portion adjoined to an entry portion.

* * * * *